Patented Apr. 17, 1945

2,373,817

UNITED STATES PATENT OFFICE 2,373,817

DYESTUFFS OF THE ANTHRAQUINONE SERIES

William Dettwyler, Pitman, N. J., assignor to E. I. du Pont de Nemours & Company, Wilmington, Del., a corporation of Delaware No Drawing. Application December 12, 1940, Serial No. 369,753

1 Claim. (Cl. 260—276)

This invention relates to the preparation of new and valuable dyestuffs of the anthraquinone series and more particularly to the preparation of a new dye of the type generally referred to as of the dianthrimide-carbazole class.

In U. S. patents to Gubelman and Dettwyler, 1,969,210 and 1,969,216, di- and tri-anthrimides, and their acid ring-closed products, are described which include in the molecule the anthraquinone-2:1-(N)-benzacridone nucleus. These dyes dye cotton in yellow-brown to dark brown shades but, characteristic of the class of anthrimide-carbazole dyes, they do not show sufficient strength in printing to be of commercial interest for that purpose. In all examples, of these patents, the anthraquinone compound that is condensed with the anthraquinone benzacridone, carries no substituent in the benz-ring to which the anthrimide linkage is attached. The products of U. S. P. 1,969,210 are also all prepared by the dry aluminum chloride fusion, i. e., fusion with the aluminum chloride in the absence of organic solvents or diluents and because such dry fusion required temperatures of around 140° C., or above ring-closure of those compounds which carried benzoyl-amino groups under such conditions result in de-benzoylation.

In U. S. Patent 2,036,663 to Weiland and Dettwyler, ring-closure of the di- and tri-anthrimide, which carried a benzacridone group, with aluminum chloride in nitro benzene is disclosed. This process was found to give dyes of more uniform shade from batch to batch and dyes which exhibited increased strength although of substantially the same shades as those obtained by the dry fusion.

It is an object of the present invention to prepare a desirable bordeaux brown dyestuff, of what is generally referred to as the anthrimide-carbazole series, which exhibits excellent printing and fastness properties.

I have found that a new and very desirable bordeaux brown dye can be produced by condensing 5-amino-2:1-(N)-anthraquinonebenzacridone with 1-benzoylamino-4-chloro-anthraquinone followed by a ring-closure condensation with aluminum chloride in nitrobenzene at temperatures below that at which any material amount of debenzoylation takes place preferably at from 50 to 100° C. The resulting color after being acid pasted and treated in the acid suspension with an oxidizing agent such as an alkali metal bichromate in the usual manner, exhibits application and fastness properties far surpassing the brown dyes of U. S. P. 1,969,210. It shows excellent strength particularly when employed in mixtures with other colors, and it may be printed as well as dyed for it shows excellent printing properties. It also exhibits much improved fastness properties particularly to light and bleach.

While this new dye may be considered as of the anthrimide carbazole class, its actual molecular configuration has not been established with certainty and it will be identified by the usual methods heretofore employed when defining colors of this class.

The following examples are given to illustrate the invention. The parts used are by weight.

Example 1

Thirty-four parts of 5-amino-2:1-(N)-anthraquinone-benzacridone, 36 parts of 1-benzoylamino-4-chloro-anthraquinone, 10 parts of soda ash and 1 part of cuprous chloride are heated in 700 parts of nitrobenzene at reflux temperature for 8 hours. The crystalline condensation product is filtered off from the mass after cooling and is washed with nitrobenzene to remove the mother liquor. The filter cake is then steam distilled free of solvent. The so obtained 4'-benzoyl-amino-6:5-(N)-benzacridone-1':1-dianthrimide is a dark violet crystalline compound, which dissolves in concentrated sulfuric acid with an olive color. It is sparingly soluble in high boiling organic solvents.

Example 2

Fifty parts of the dianthrimide of Example 1 are dissolved in a freshly prepared solution of 150 parts of aluminum chloride in 500 parts of nitrobenzene. A brown solution is obtained which upon heating to 50° C. changes to a violet. Heating is continued at 50–55° C. for one hour and the mass is poured into ice and water and stirred until the aluminum complex is decomposed. The solvent is then removed by steam distillation and the product freed from aluminum salts, which are in the water solution, by filtration. The resulting dye is a dark brown powder, soluble in concentrated sulfuric acid with a red color. When made into the usual color paste by any of the known methods such as by acid pasting and treating with an alkali metal bichromate it dyes cotton from brown violet vat in bordeaux brown shades of excellent fastness properties. It also exhibits excellent printing properties.

If desired the condensation and ring closure of Examples 1 and 2 may be carried out without isolation of the dianthrimide as more particularly described in U. S. Patent 2,036,663.

I claim:

The dyestuff identical with that obtained by the aluminum chloride condensation of 4'-benzoylamino-6:5-(N)-benzacridone-1'-1-dianthrimide in nitro benzene at temperatures below that at which substantial debenzoylation takes place, which in dry form is a dark brown powder soluble in concentrated sulphuric acid with a red color and which dyes cotton from an alkaline hydrosulphite vat in bordeaux brown shades of excellent fastness properties.

WILLIAM DETTWYLER.